(12) United States Patent
Dunbar et al.

(10) Patent No.: US 8,238,334 B2
(45) Date of Patent: Aug. 7, 2012

(54) OPTIMAL PATH SELECTION FOR ACCESSING NETWORKED APPLICATIONS

(75) Inventors: Linda Dunbar, Plano, TX (US); Lucy Yong, McKinney, TX (US); Young Lee, Plano, TX (US)

(73) Assignee: Futurewei Technologies Inc., Plano, TX (US)

( * ) Notice: Subject to any disclaimer, the term of this patent is extended or adjusted under 35 U.S.C. 154(b) by 1023 days.

(21) Appl. No.: 11/742,578

(22) Filed: Apr. 30, 2007

(65) Prior Publication Data
US 2008/0267088 A1 Oct. 30, 2008

(51) Int. Cl.
*H04L 12/28* (2006.01)
(52) U.S. Cl. ......................... 370/389; 709/217
(58) Field of Classification Search .................. 370/389, 370/254, 352; 709/217
See application file for complete search history.

(56) References Cited

U.S. PATENT DOCUMENTS

| | | | |
|---|---|---|---|
| 7,272,625 B1 * | 9/2007 | Hannel et al. | 709/200 |
| 7,395,058 B1 * | 7/2008 | Kalofonos et al. | 455/423 |
| 2003/0217147 A1 * | 11/2003 | Maynard et al. | 709/225 |
| 2005/0005038 A1 * | 1/2005 | Ayukawa et al. | 710/38 |
| 2005/0053057 A1 * | 3/2005 | Deneroff et al. | 370/360 |
| 2006/0106670 A1 * | 5/2006 | Cai et al. | 705/13 |

FOREIGN PATENT DOCUMENTS

| | | |
|---|---|---|
| CN | 1777113 | 5/2006 |
| JP | 2003273905 | 9/2003 |
| WO | 2005083975 A2 | 9/2005 |

OTHER PUBLICATIONS

Foreign communication from a related counterpart application—International Search Report and Written Opinion, PCT/CN2008/070567, Jul. 10, 2008, 6 pages.

* cited by examiner

*Primary Examiner* — Chi Pham
*Assistant Examiner* — Wei Zhao
(74) *Attorney, Agent, or Firm* — Conley Rose, P.C.; Grant Rodolph (57) ABSTRACT

An efficient and user-friendly application service access method utilizing network dynamic conditions and application traffic requirements. This method allows applications to register their servers' location information and traffic requirements with the network and provides an optimal connection to application service without specifying an application server location for an end user and based on network conditions and application requirements.

20 Claims, 6 Drawing Sheets

OPTIMAL PATH SELECTION FOR ACCESSING NETWORKED APPLICATIONS

BACKGROUND OF THE INVENTIONS

The present application relates to access application services in a network, and more particularly to user friendly provision of end user connection, to an application service, which is optimally based on the network dynamic conditions and application requirements in a network.

Background: Path Computation Elements (PCE) and Applications

As Internet based applications grow rapidly, network service providers need to support different bandwidth-on-demand services. Examples include large file downloading, on-line video gaming, and on-line conferencing. These kinds of applications sometimes require a peer to peer connection with a dedicated bandwidth between a user and an application; and the application could be offered concurrently on multiple servers that are physically attached to the network at different locations. The user can initiate a connection request to any one of these servers for the application service from anywhere within the network.

Figure 3:
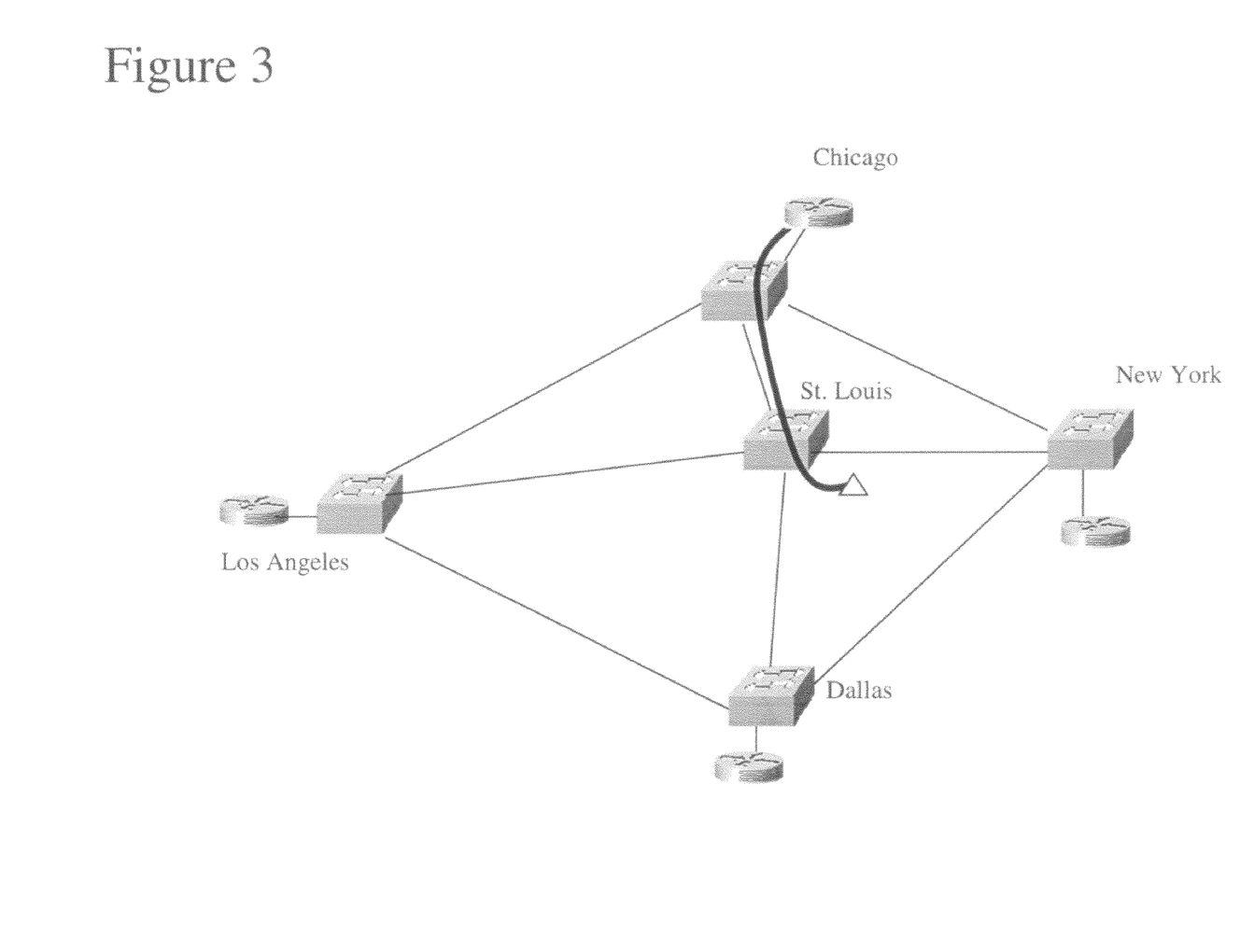
FIG. 3 shows an example with one user attempting to access a gaming service that could be offered at one of multiple game servers on different network locations.

FIG. 3 illustrates an example: a user attaches to a network at St. Louis; several servers attach to the network at New York, Chicago, Dallas, and Los Angles, respectively. Assume all servers are running a "StarWar" application. When the user wants to play this online video game, the game proxy program on the user computer must connect to the network with adequate bandwidth. In this example, suppose that the best service would occur if the Chicago site is used for the connection. However, how is this optimal connection to be discovered. If the user or user application specifies a different target address (e.g. Los Angeles), the user's program will be attached to that server, even if the server is overloaded or the connection routes to it have bottlenecks.

Connection between two network entities requires path computation, Path computation is especially challenging in today's large, multi-domain, multi-region and multi-layers networks. A network can have multiple domains, because a path might cross between the networks of different service providers. A network can include multiple regions, since connected entities might be located at different geographic areas. A network can have multiple layers, because an IP network might be built on Multi-Protocol Label Switching (MPLS) or Generalized Multi Protocol Label Switching (GMPLS) based optical network networks.

The IETF has proposed, in RFC 4655, a path computation solution in large, multi-domain and multi-layer networks with special computational components and cooperation between the elements in different domains. A Path. Computation Element ("PCE") is an entity that is capable of computing a network path or route based on a network graph, and of applying computational constraints during the computation. The PCE entity is an application that can be located within a network node or component, on an out-of-network server, etc.

Figure 4:
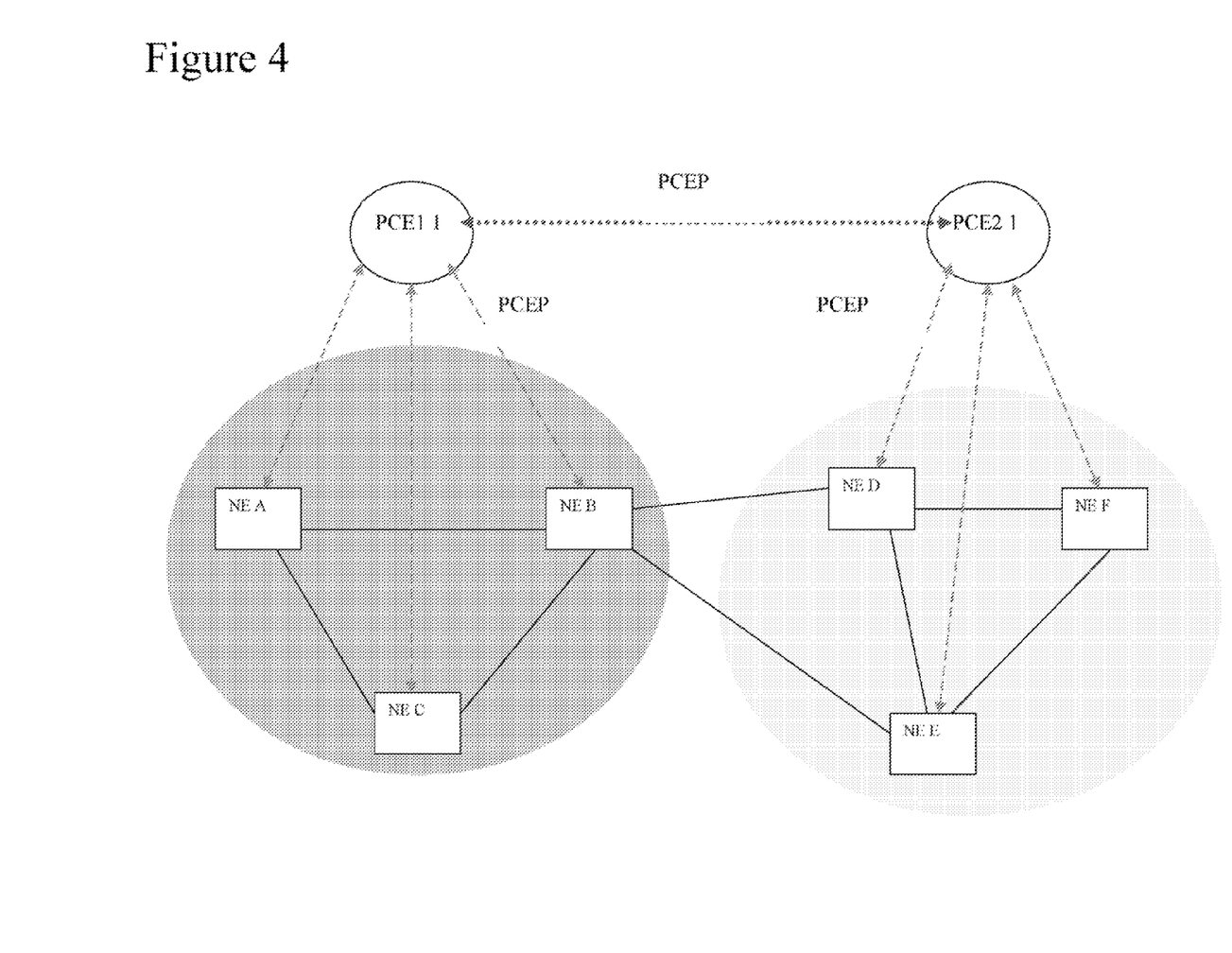
FIG. 4 shows an example of a PCE's Architecture.

FIG. 4 illustrates a PCE based network architecture. The connection request comes to a Path Computation Client ("PCC") first. A PCC (not shown in FIG. 4) is normally co-located with a Network Node or Network Element ("NE"). A PCC is a client application requesting a path computation to be performed by the PCE, PCC then sends a path computation request to a PCE through the PCE protocol ("PCEP"). PCE computes a path and sends the selected path information back to PCC using PCEP.

FIG. 4 shows two PCEs in the networks. Each is capable of computing a path within its own network domain. A domain is any collection of network elements within a common sphere of address management or path computation responsibility. Examples of domains include IGP areas, Autonomous Systems (ASes), and multiple ASes within a Service Provider network. Domains of path computation responsibility may also exist as sub-domains of areas or ASes. When a connection is across two domains (or sub-domains), both PCEs may get involved with the path computation process to find an inter-domain path.

Overview, of the PCE-Based Architecture Composite PCE

Figure 5:
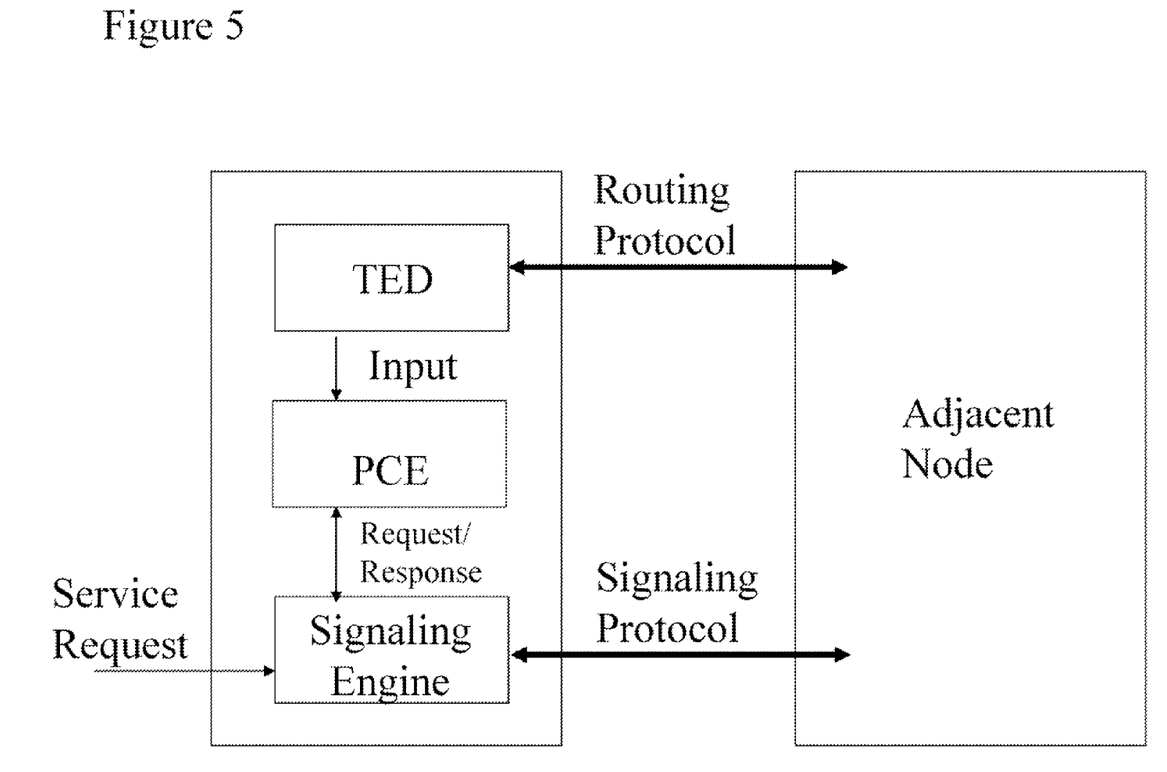
FIG. 5 shows a PCE's Architecture, for the case of a composite PCE node.

FIG. 5 shows the components of a typical composite PCE node (that is, a NE such as router also implements the PCE functionality) that utilizes path computation. The routing protocol is used to exchange TE information from which the Traffic Engineering Database ("TED") is constructed. Service requests to provision TE LSPs (Traffic Engineering Label Switching Paths) are received by the node and converted into signaling requests, but this conversion may require path computation that is requested from a PCE. The PCE operates on the TED subject to local policy in order to respond with the requested path.

Note that the routing adjacency between the composite PCE and any other router may be performed by means of direct connectivity or any tunneling mechanism.

External PCE

Figure 6:
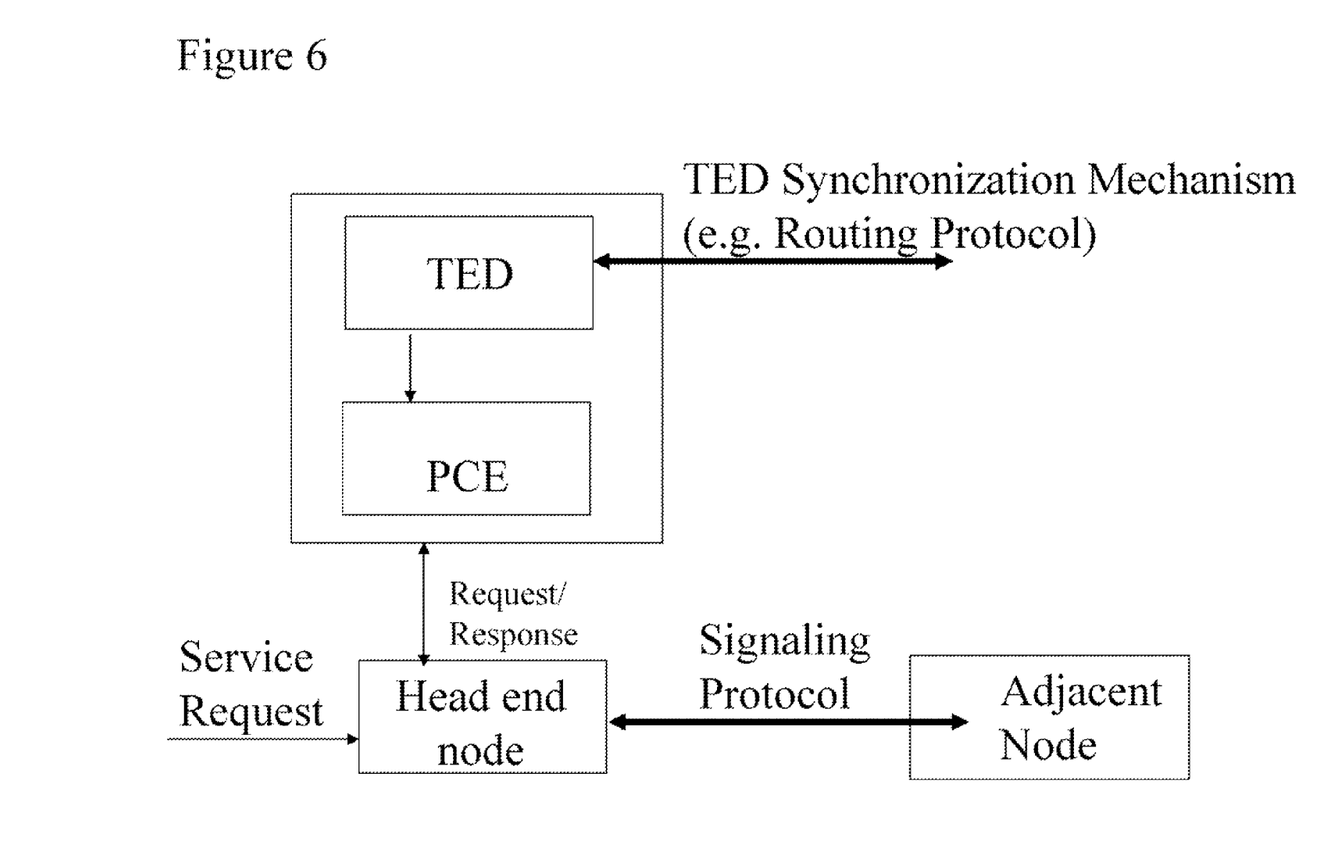
FIG. 6 shows a PCE's Architecture, for the case of an external PCE node.

FIG. 6 shows a PCE that is external to the requesting network element. A service request is received by the head-end node, and before it can initiate signaling to establish the service, it makes a path computation request to the external PCE. The PCE uses the TED subject to local policy as input to the computation and returns a response.

Note that in this case, the node that supports the PCE function may also be an LSR (Label Switching Router) or router performing forwarding in its own right (i.e., it may be a composite PCE node), but those functions are purely orthogonal to the operation of the function in the instance being considered here.

PCE Interface Requires Network Addresses

Normally a PCE requires two explicitly identified addresses to compute a route. In the "StarWar" example above, the PCE requires a source address, i.e. the network address of the player the user is using (for example, a mobile phone or laptop PC), and a destination address, the network address of the host of the game server. This requirement is neither flexible and nor user-friendly. A user should not be required to have the knowledge of network topology such that she knows the application server's addresses.

Even if the user is very knowledgeable about the network topology, he still has no knowledge of the connectivity or traffic conditions of the network and application servers to make an optimal decision to select a destination address. To make an optimal decision, he will have to find, the addresses of all the servers hosting the requested application, then send a request with the address of each server to the network to let PCE compute an optimal path, to each server. Finally, he compares multiple paths to determine which one offers the optimal path to the requested service.

Path Selection Policy

A PCE may have a local policy that impacts path computation and selection in response to a path computation request. Such policy may act on information provided by the requesting PCC. The result of applying such policy includes, for example, rejection of the path computation request, or provision of a path that does not meet all of the requested constraints. Further, the policy may support administratively configured paths, or selection, among transit providers. Inclusion of policy within PCE may simplify the application of policy within the path computation/selection process.

Similarly, a PCC may apply local policy to the selection of a PCE to compute a specific path, and to the constraints that are requested.

In a PCE context, the policy may be sensitive to the type of path that is being computed. For example, a different set of policies may be applied for an intra-area or single-layer path than would be provided for an inter-area or multi-layer path.

Again, how a user finds out and stores local policy about the application the user is using are outside the scope of the PCE architecture. For instance, applications have different requirements on uplink and downlink bandwidths, and application servers support various maximum number of users. PCE specifications in IETF did not address those issues, but they are nevertheless very important for the growth of Internet applications based on PCE architecture.

SUMMARY OF THE INVENTIONS

The present application provides new approaches for end users to access application services with optimal routing. The preferred embodiment allows an end user to send a request for service to the network by using application or service name. Then the network finds a server that provides requested services with optimal route between the user and the server based on dynamic network conditions and application requirements, and connects the end user with that server. The teachings in this document enable an end user accessing a service concurrent running at multiple servers at different network locations.

The advantages of the proposed approaches are highlighted as follows:

The new approaches offer user-friendly interface by using application or service names to access application services instead of using network addresses; and The new approaches provide end users with optimal connection to the requested service based on current network conditions and application requirements.

A net result is that users see higher service quality.

Another result is that the network is like to have fewer bottlenecks.

Another result is that the network's capacity is used more efficiently.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Service Application Registration

Figure 1:
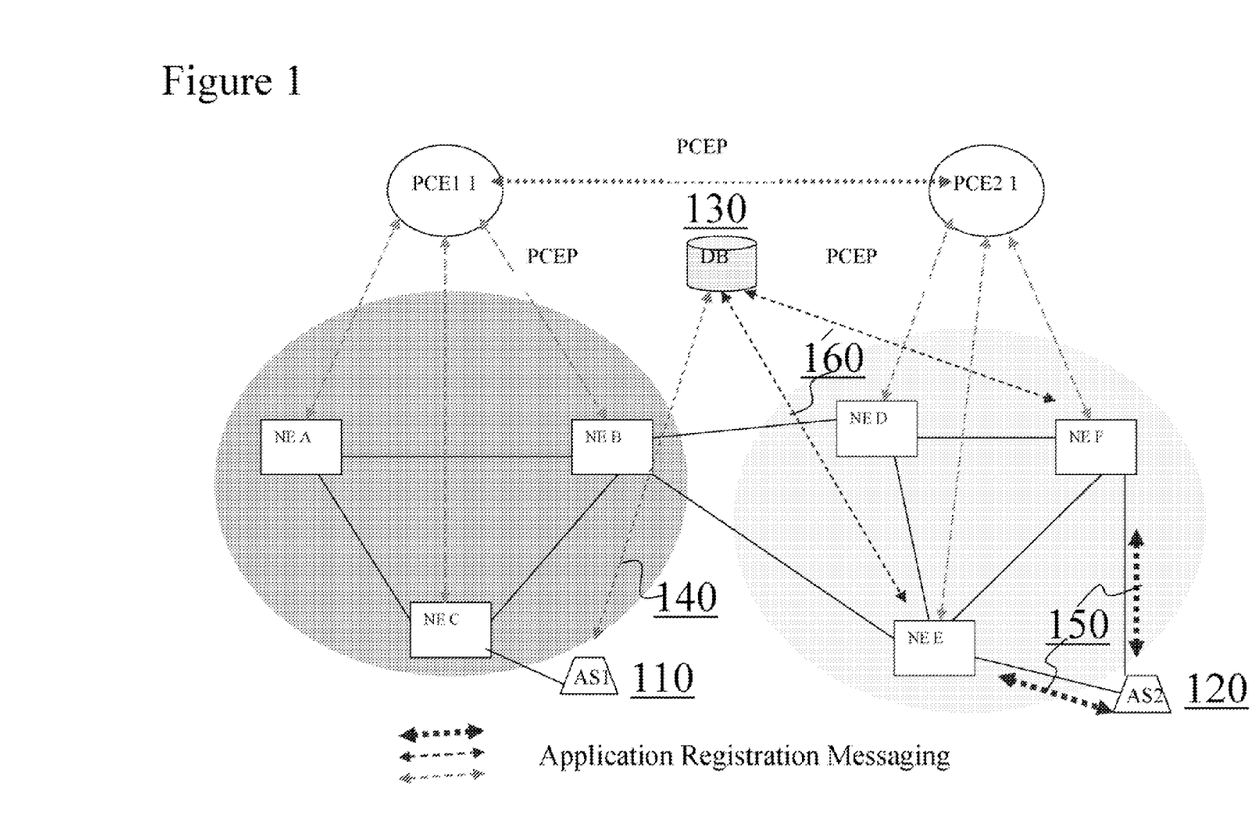
FIG. 1 shows an example of a new PCE based network architecture.

Generally when an application server is physically connected to the network, certain bandwidth is allocated between the network node and the server. The preferred embodiment allows a newly added server to register its applications with the network. A database system can be used to store application information such as service name, address, bandwidth requirement, server capacity, and maximum number of users supported, etc. Note that for various reasons, such as transport resource saving, fault tolerance or load balancing, multiple servers can host the same application concurrently, therefore, there could be multiple addresses for one service name. FIG. 1 shows an example PCE based network architecture with two application servers (AS1 110 and AS2 120) and one service register database (DB) 130. A registration protocol is needed between a server and the database. The protocol will let server to update its application information in the database. However, the design and selection of this protocol is outside the scope of this application and should be obvious to one with ordinary skills in the art.

To sum up the options for this protocol, the network could allow an application server to register its applications to a node to which the server is connected 150, then network node passes the information to the database 160; alternatively the network could allow a server to directly send information to the database through Internet or other communication channel 140. The database in FIG. 1 is separated from PCE. However, another class of embodiments can integrate the service database with PCE. In such a design, each PCE maintains the service information from the application server attached to its domain; the registration protocol is deployed between PCE and network node/server.

When an application is activated or deactivated on a server, the server needs to update the database on the current status of the application. The preferred embodiment provides auto-refresh method. This method requires each application server periodically sending an announcement message to the database. If the database does not receive the message for certain period of time, the information for this application or application location will be removed from the database.

A modified service discovery protocol defined by IETF could be used to implement registration and auto refresh.

End-User Access to Service

Figure 2:
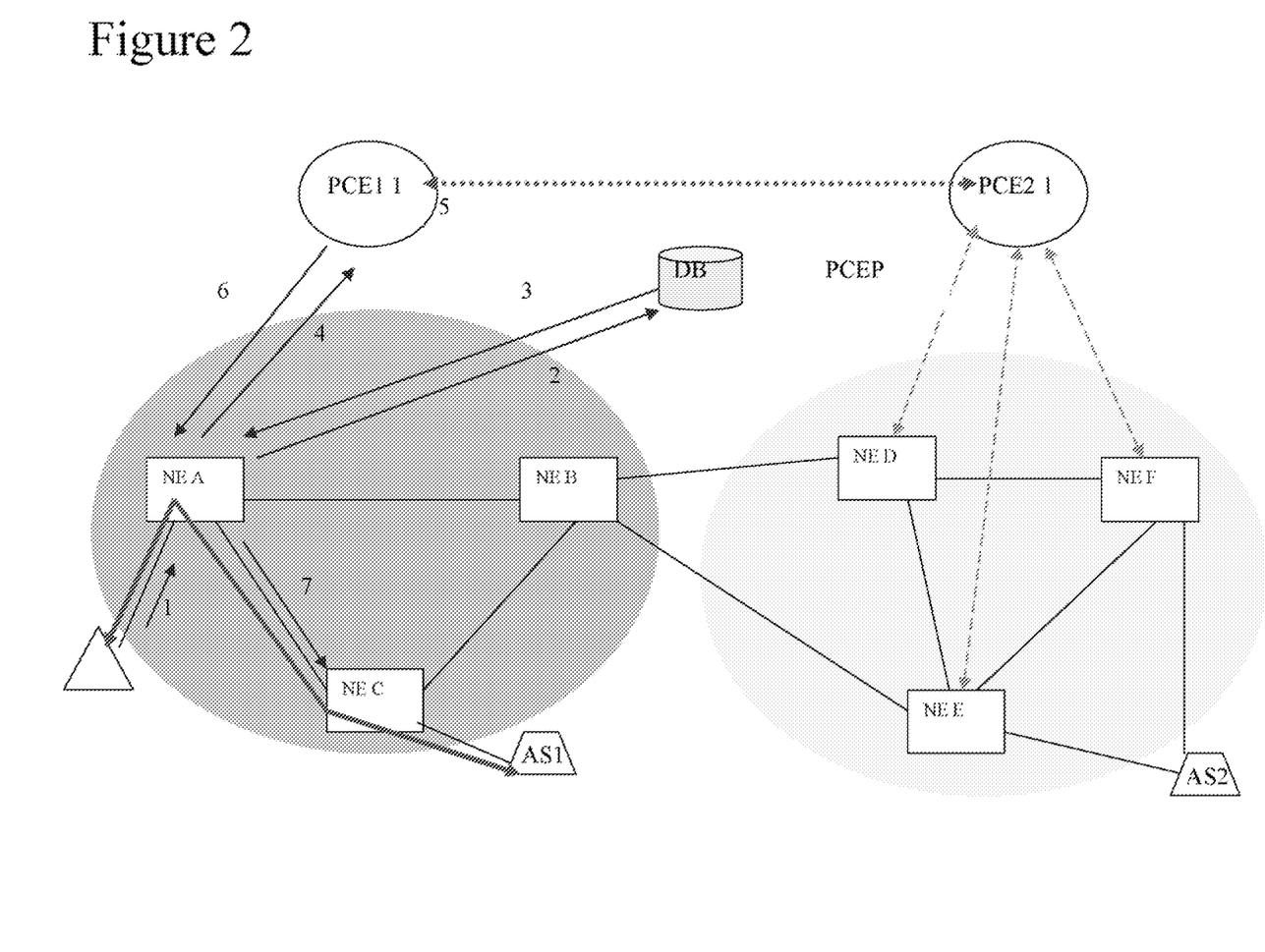
FIG. 2 shows how the new approach provides a user optimal access to an application service.

FIG. 2 illustrates how the new approach provides a user optimal access to an application service. Sample steps are:

(1) A user application sends a connection request with a service name and user device bandwidth constraint information to the PCC (NEA) the user device is attached to. There could be other parameters too such as delay constraint, access duration, and etc.

(2) The PCC sends a message with the service name to the database.

(3) The database does a lookup and sends back to PCC a list of server node addresses that, user could connect to, along with those servers' traffic information: bandwidth requirement, maximum, number of users supported or current number of users served.

(4) PCC sends the path computation request to PCE with one source node address and a list of destination addresses, as well as the servers' traffic information.

(5) PCE calculates the paths from source address to every destination address and select one optimal path for PCC based on the selection criteria (described below)

(6) PCE sends the selected path information back to the PCC, (7) PCC set up the connection path via MPLS or GMPLS signaling.

Alternatively, in another class of embodiments, the PCC sends the path computation request to PCE with the service name directly. The PCE communicates with the database to get destination, node addresses; then it computes paths, selects an optimal one, and sends the path information back to the PCC. This method is preferred when the database is integrated with the PCE.

The new approach needs some protocol enhancement on existing path communication protocol (PCEP) defined by IETF. In the preferred embodiment, PCEP should allow PCC to specify single path selection when one source and multiple destination address given in a PCC request. Alternatively, PCEP has to distinguish the regular path computation from the path computation given service name. The server name could be specified in the existing object with a new attribute or in a new object. It also needs to add a type object in the request message to differentiate the different types of path computation requests.

PCE uses some policies as selection criteria for the path selection. Some of these can include:
Shortest distance;
Available bandwidth or bandwidth allocation between server and its attached node;
Weighted available bandwidth or bandwidth allocation between server and its attached node, in this case, if a server only has a small scale capacity, even it has a large available bandwidth connected to the network, the server can only handle certain load. Therefore, it could specify the equivalent allowed bandwidth in the database.
Comprehensive rule combined from above.
(Note that this is not an exhaustive list.)

When there are many servers supporting the same application, it may become a burden for PCE to compute all the paths and select only one path for PCC. A selective method can alternatively be used. In this method, either the database or PCC limits the maximum number of destination addresses to be sent to PCE. Thus, PCE only needs to compute a small set of paths dynamically.

Another way to achieve path selection when there is one source and multiple destinations exist, is: the PCC sends each source/destination pair to the PCE for the path computation. The PCC will collect all the paths computed by the PCE and select one path (based on some policy residing in the PCC) and go through the path establishment.

For networks that support traffic engineering, the connection path is set up with bandwidth reservation along the path. For networks that do not support traffic engineering, the connection path is set up without bandwidth reservation. The new approach disclosed here applies to both types of networks.

Connection Request at UNI and NNI

ASON/GMPLS control plane allows a user to request connection through user and network interface (UNI) and a network to request connection from another network through network to network interface (NNI). The new approach can enhance ASON/GMPLS by enabling a user or network to specify a connection request by using a service name. The network is responsible to find a proper application location.

Scheduled Connection Request

The new approach can also be used in scheduled connection request. User could send a connection request ahead of service time to scheduler by giving service name, service time, source location address, etc. The request will be stored in a reservation system. At the service time, the reservation system sends the connection request to PCC to set up the connection. When a user starts running the application, the connection is already established.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Some examples of modifications and variations are briefly mentioned above, but many others are possible.

For example, in one preferred embodiment the service database is an independent entity separate from other entities in the network. However, in other embodiments, the database can be integrated with either PCE or NE such that the registration information can be distributed to multiple databases with each one maintaining the information of the application and its servers within its domain.

For another example, instead of using an auto-refresh method to update application status, other classes of embodiments can instead implement update on demand. The database maintains the registration information on permanent basis, and only updates the information when requested by servers. This method can avoid the overhead of frequent periodical refresh messages from servers in the network.

For another example, instead of implementing optimal path selection on PCE, this logic can alternatively be implemented on PCC, or even in the user application. This alternative minimizes the modifications required to the PCE architecture as defined by IETF, by distributing the intelligence of optimal path selection to PCC or user applications.

In yet another embodiment, instead of requiring user to supply parameters such as user device bandwidth constraint, PCC will automatically collect such information and supply those parameters to PCE.

In various alternative embodiments, a PCE can use various policies as selection, criteria for the path selection. Some examples include: Shortest distance; Available bandwidth or bandwidth allocation between server and its attached node; Available bandwidth or bandwidth allocation between server and user end-to-end; Available processing capacity of the server; Weighted available bandwidth or bandwidth allocation between server and its attached node, and/or end-to-end; and/or combinations of these factors, possibly with other factors.

None of the description in the present application should be read as implying that any particular element, step, or function is an essential element which, must be included in the claim, scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for connecting a user to a service in a network, comprising:

receiving a request for the service by a service name, and not by a unique address specifier;

accessing a data repository to resolve the service name into a list of multiple addresses corresponding to a plurality of servers hosting the service;

calculating a plurality of paths from the user to each of the plurality of servers;

selecting an optimal server based upon the calculation; and connecting the user to the service on the optimal server.

2. The method of claim 1, wherein said data repository is a database system.

3. The method of claim 1, wherein said service name is a domain name.

4. The method of claim 1, wherein said address is an IP address.

5. The method of claim 1, wherein said resolving of name to addresses is accomplished by a path computation element network.

6. The method of claim 1, wherein a path computation element network computes said optimal path.

7. The method of claim 6, wherein the optimal path selection is dependent upon at least one of server capacity, maximum number of users supported, and numbers of users currently using the service.

8. A method for optimally accessing application services in a transport network, comprising:

registering at least one service application instance with said network, wherein a user sends a request to said network for said application service which is specified merely by a name, and not by a fill address; and in a control plane, dynamically routing said request through the transport network, using performance information for said transport network and information from said registering action to make an optimal determination of a server offering said application service out of a plurality of servers offering said application service and of a route to said server.

9. The method of claim 8, wherein registering action uses a database system.

10. The method of claim 8, wherein said registering action uses either a Lightweight Directory Access Protocol or a domain name server (DNS) protocol.

11. The method of claim 8, wherein said registering action uses a X.500 based directory service.

12. The method of claim 8, wherein said registering information includes service name or ID, server addresses and traffic requirements.

13. The method of claim 8, wherein said registering information includes service name or ID, server addresses, bandwidth required for uplink and downlink in individual servers, and maximum number of users supported at ones of said server.

14. The method of claim 13, wherein said traffic information indicates the number of current users at ones of said servers.

15. A network architecture providing connection between a user and a requested application service in a network comprising:

a plurality of servers having an application installed and in operation;

a database system wherein ones of said servers are registering and updating said application and server information;

a path computation client which receives a user's request for said application referenced by name instead of address; and a path computation element;

wherein said path computation client and said path computation element cooperatively retrieve said application and said server information from said database system for selecting an optimal server out of the plurality of servers in dynamic dependence on said information and network performance information and connecting said user to said optimal server.

16. The architecture of claim 15, wherein said database is based on a directory system.

17. The architecture of claim 15, wherein said database update is based on auto-refresh.

18. The architecture of claim 15, wherein said database update depends on events of said servers.

19. The architecture of claim 15, wherein said server information includes said service name/Id and said servers' addresses.

20. The architecture of claim 15, wherein said traffic information includes the number of current users at said servers.

* * * * *

UNITED STATES PATENT AND TRADEMARK OFFICE
CERTIFICATE OF CORRECTION

PATENT NO. : 8,238,334 B2
APPLICATION NO. : 11/742578
DATED : August 7, 2012
INVENTOR(S) : Linda Dunbar, Lucy Yong and Young Lee It is certified that error appears in the above-identified patent and that said Letters Patent is hereby corrected as shown below:

Column 8, lines 4-8, claim 13, should read "The method of claim 8, wherein said registering information includes service name or ID, server addresses, bandwidth required for uplink and downlink at individual servers, and maximum number of users supported at ones of said server."

Signed and Sealed this
Ninth Day of October, 2012

David J. Kappos
*Director of the United States Patent and Trademark Office*